(12) United States Patent
Yu et al.

(10) Patent No.: US 7,580,084 B2
(45) Date of Patent: Aug. 25, 2009

(54) LIQUID CRYSTAL DISPLAY DEVICE HAVING IMAGE SENSING FUNCTION

(75) Inventors: Sang Hee Yu, Gunpo-si (KR); Sang Chul Han, Seoul (KR); Hee Kwang Kang, Seoul (KR); Kyo Seop Choo, Suwon-si (KR)

(73) Assignee: LG. Display Co., Ltd., Seoul (KR)

( * ) Notice: Subject to any disclaimer, the term of this patent is extended or adjusted under 35 U.S.C. 154(b) by 272 days.

(21) Appl. No.: 11/212,042

(22) Filed: Aug. 19, 2005

(65) Prior Publication Data
US 2006/0279690 A1 Dec. 14, 2006

(30) Foreign Application Priority Data
Jun. 9, 2005 (KR) .................. 10-2005-0049505

(51) Int. Cl.
G02F 1/1335 (2006.01)
G06F 3/042 (2006.01)

(52) U.S. Cl. .................. 349/12; 345/104; 345/175
(58) Field of Classification Search .................. 349/12, 349/24–30; 345/104, 175
See application file for complete search history.

(56) References Cited

U.S. PATENT DOCUMENTS

| | | | |
|---|---|---|---|
| 5,530,568 A * | 6/1996 | Yamamoto et al. | 349/143 |
| 6,947,102 B2 * | 9/2005 | den Boer et al. | 349/12 |
| 2002/0030768 A1 | 3/2002 | Wu | |
| 2003/0174256 A1 | 9/2003 | Kim et al. | |
| 2003/0201450 A1 | 10/2003 | Yamazaki et al. | |
| 2004/0046900 A1 | 3/2004 | Boer et al. | |
| 2004/0201786 A1 | 10/2004 | Park et al. | |
| 2005/0117079 A1 | 6/2005 | Pak et al. | |

FOREIGN PATENT DOCUMENTS

| | | |
|---|---|---|
| JP | 11-125841 | 5/1999 |
| JP | 2000-259346 | 9/2000 |
| KR | 10-2003-58720 | 7/2003 |
| KR | 10-2005-43320 | 5/2005 |

OTHER PUBLICATIONS

First Office Action for corresponding Chinese Patent Application Serial No. 2005101171516, dated Dec. 14, 2007.
Office Action issued in corresponding Japanese Patent Application No. 2005-322476; issued Feb. 3, 2009 (Without translation. AS).

* cited by examiner

Primary Examiner—Andrew Schechter
(74) Attorney, Agent, or Firm—Brinks Hofer Gilson & Lione

(57) ABSTRACT

A liquid crystal display device includes a gate line and a data line intersecting each other on a substrate. The liquid crystal display device further includes a photo sensing device and a first thin film transistor ("TFT") located at an intersection area of the gate line. The photo sensing device operates to sense an ambient light and includes a storage capacitor to store charge generated by light. The photo sensing device is drive by a driving voltage other than the data voltage.

17 Claims, 18 Drawing Sheets

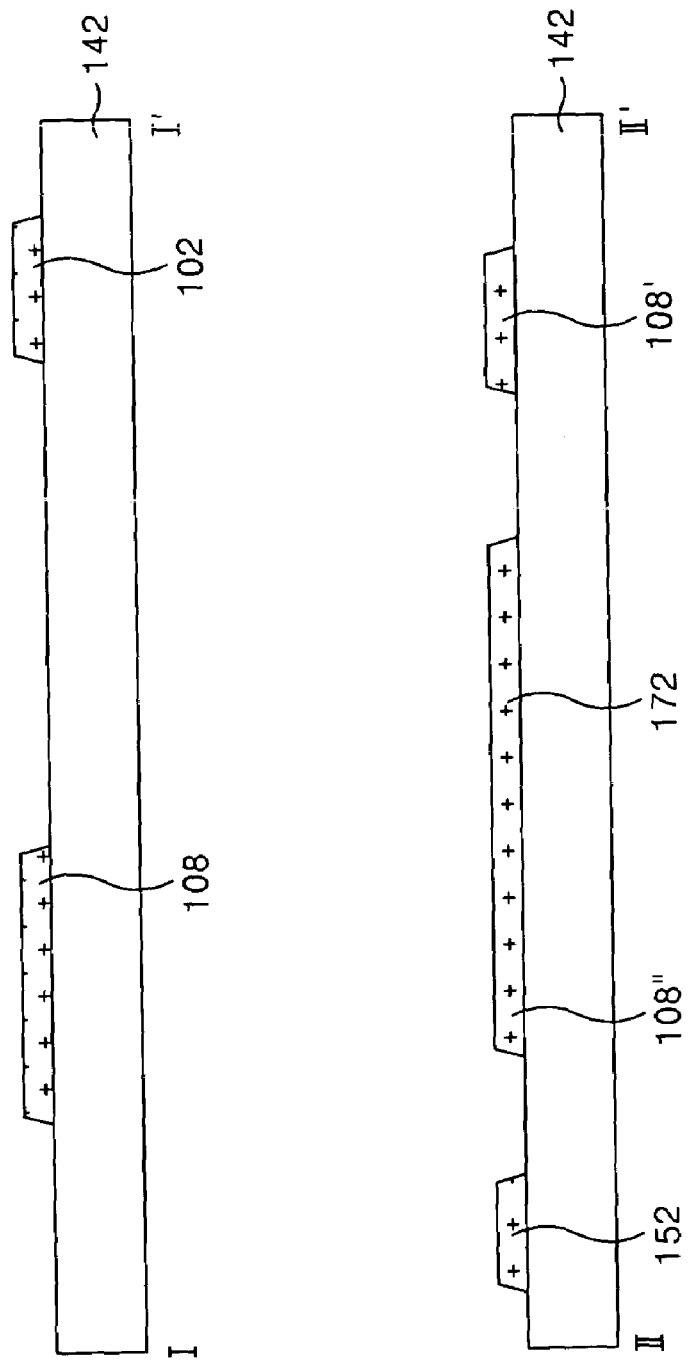

US 7,580,084 B2

LIQUID CRYSTAL DISPLAY DEVICE HAVING IMAGE SENSING FUNCTION

This application claims the benefit of the Korean Patent Application No. P2005-49505 filed on Jun. 9, 2005, which is hereby incorporated by reference in its entirety.

BACKGROUND

1. Technical Field

The invention relates to a liquid crystal display device, and more particularly to a liquid crystal display device having an image sensing function.

2. Related Art

A liquid crystal display device controls light transmittance of liquid crystal by use of electric field, thereby displaying a picture. The liquid crystal display device includes a liquid crystal display panel where liquid crystal cells are arranged in a matrix shape, and drive circuits for driving the liquid crystal display panel.

The liquid crystal display panel includes a thin film transistor array substrate and a color filter array substrate which are disposed to be opposite to each other. Spacers are located between the two substrates to keep a uniform cell gap. A liquid crystal is filled in the cell gap.

The thin film transistor array substrate includes gate lines and data lines. A thin film transistor ("TFT") is formed as a switching device at each intersection of the gate lines and the data lines. Pixel electrodes are formed by the liquid crystal cell and connected to the thin film transistors. An alignment film spreads over the pixel electrodes. The gate lines and the data lines receive signals from the drive circuits through each pad part. The thin film transistor supplies the pixel electrode with a pixel voltage signal supplied to the data line in response to a scan signal supplied to the gate line.

The color filter array substrate includes color filters formed by the liquid crystal cell and a black matrix for dividing the color filters and reflecting an external light. A common electrode commonly supplies a reference voltage to the liquid crystal cells and an alignment film spreads over the common electrode.

The liquid crystal display panel is completed by injecting and sealing the liquid crystal after making the thin film transistor array substrate and the color filter array substrate and bonding them together. The liquid crystal display device operates to display an image. The liquid crystal display device may not have a function that senses and displays an external image which is realized as a content picture such as an external document or image. A separate device such as an image sensing device may be needed to sense the image.

FIG. 1 is a diagram illustrating a related art image sensing device 5. The image sensing device 5 includes a photo TFT 40, a storage capacitor 80 connected to the photo TFT 40, a switch TFT 6 located in the opposite direction to the photo TFT 40 with the storage capacitor 80 disposed therebetween.

The photo TFT 40 includes a gate electrode 8 formed on a substrate 42; an active layer 14 overlapping the gate electrode 8 with a gate insulating film 44 interposed therebetween; a drive source electrode 60 electrically connected to the active layer 14; and a drive drain electrode 62 opposite to the drive source electrode 60. The active layer 14 is formed to overlap the drive source electrode 60 and the drive drain electrode 62, and further includes a channel part between the drive source electrode 60 and the drive drain electrode 62. An ohmic contact layer 48 is further formed on the active layer 14 for being in ohmic contact with the drive source electrode 60 and the drive drain electrode 62. The photo TFT 40 operates to sense the light which is incident by a designated image such as a document or a human finger print.

The storage capacitor 80 includes a storage lower electrode 72 connected to the gate electrode 8 of the photo TFT 40, an insulating film 44 and a storage upper electrode 74 formed to overlap the storage lower electrode 72 and connected to the drive drain electrode 62 of the photo TFT 40. The storage capacitor 80 stores the electric charge generated by a photo current. The photo current generates in the photo TFT 40.

The switch TFT 6 includes a gate electrode 8' formed on a substrate 42; a source electrode 10' connected to the storage upper electrode 74; a drain electrode 12' opposite to the source electrode 10'; and an active layer 14' which overlaps the gate electrode 8' and forms a channel between the source electrode 10' and the drain electrode 12'. The active layer 14' is formed to overlap with the source electrode 10' and the drain electrode 12' and further includes a channel part between the source electrode 10' and the drain electrode 12'. An ohmic contact layer 48' is further formed on an active layer 14' for being in ohmic contact with the source electrode 10' and the drain electrode 12'. This switch TFT6 is protected from incidence light by light-protection layer 41.

The driving of the image sensing device 5 is explained. A driving voltage, e.g., about 10V, is applied to the drive source electrode 60 of the photo TFT 40, and a reverse bias voltage, e.g., about −5V, is applied to the gate electrode 8. A light is sensed at the active layer 14. There is generated a photo current path which runs from the drive source electrode 60 to the drive drain electrode 62 through the channel in accordance with the sensed light intensity. The photo current path runs from the drive drain electrode 62 to the storage upper electrode 74. The storage lower electrode 72 is connected to the gate electrode 8 of the photo TFT 40, and the electric charge is charged in the storage capacitor 80 by the photo current. In this way, the electric charge in the storage capacitor 80 is transmitted to the switch TFT 6, and the image is sensed by the photo TFT 40, can be read by a read-out IC.

The separate image sensing device includes a photo TFT, a storage capacitor connected to the photo TFT, and a switch TFT located in the opposite direction to the photo TFT with a storage capacitor therebetween.

As noted above, the liquid crystal display device and the image sensing device are separately constructed and operate to perform its own functions, respectively. Accordingly, there is a need of a liquid crystal display device having an image sensing function.

SUMMARY

By way of introduction only, in one embodiment, a liquid crystal display device includes a gate line and a data line intersecting each other on a substrate. The liquid crystal display device further includes a photo sensing device and a first thin film transistor ("TFT") located at an intersection area of the gate line. The photo sensing device operates to sense an ambient light and includes a storage capacitor to store charge generated by light. The photo sensing device is drive by a driving voltage other than the data voltage.

In other embodiment, a fabricating method of a liquid crystal display device is provided. In the fabricating method, a gate pattern is formed on a substrate and first, second and third semiconductor patterns are formed over the gate pattern. A first source/drain pattern, a second source/drain pattern and a third source/drain pattern are formed on the first, second and third semiconductor patterns. A photo TFT is formed with the first source/drain pattern, a pixel TFT is formed with the second source/drain pattern and a switching TFT is formed with the third source/drain pattern. A passivation film is formed to form a contact hole. A transparent electrode pattern is formed that includes a pixel electrode.

In another embodiment, an image sensing method of a liquid crystal display device is provided. In the image sensing method, a light having designated image information is irradiated to a photo sensing device where the photo sensing device is integrated with the liquid crystal display device. The light irradiated to the photo sensing device is converted into a designated signal. The image information is detected based on the converted signal.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 13A to 13E illustrate a fabrication method of a liquid crystal display device having an image sensing function.

DETAILED DESCRIPTION OF THE PREFERRED EMBODIMENT

Reference will now be made in detail to the preferred embodiments, examples of which are illustrated in the accompanying drawings. Hereinafter, the preferred embodiments will be described in detail with reference to FIGS. 2 to 14.

Figure 1:
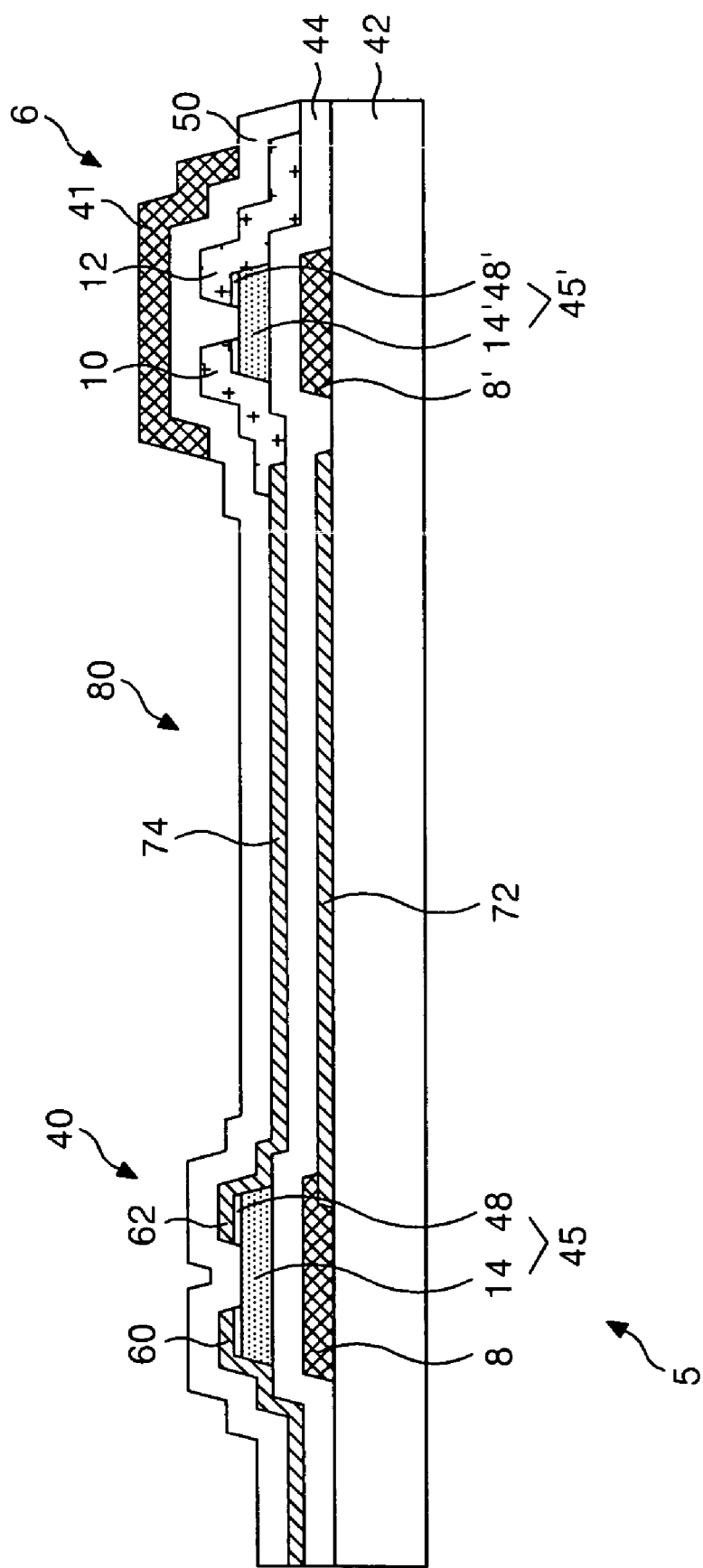
FIG. 1 illustrates a sectional view of a related art image sensing device.
Figure 2:
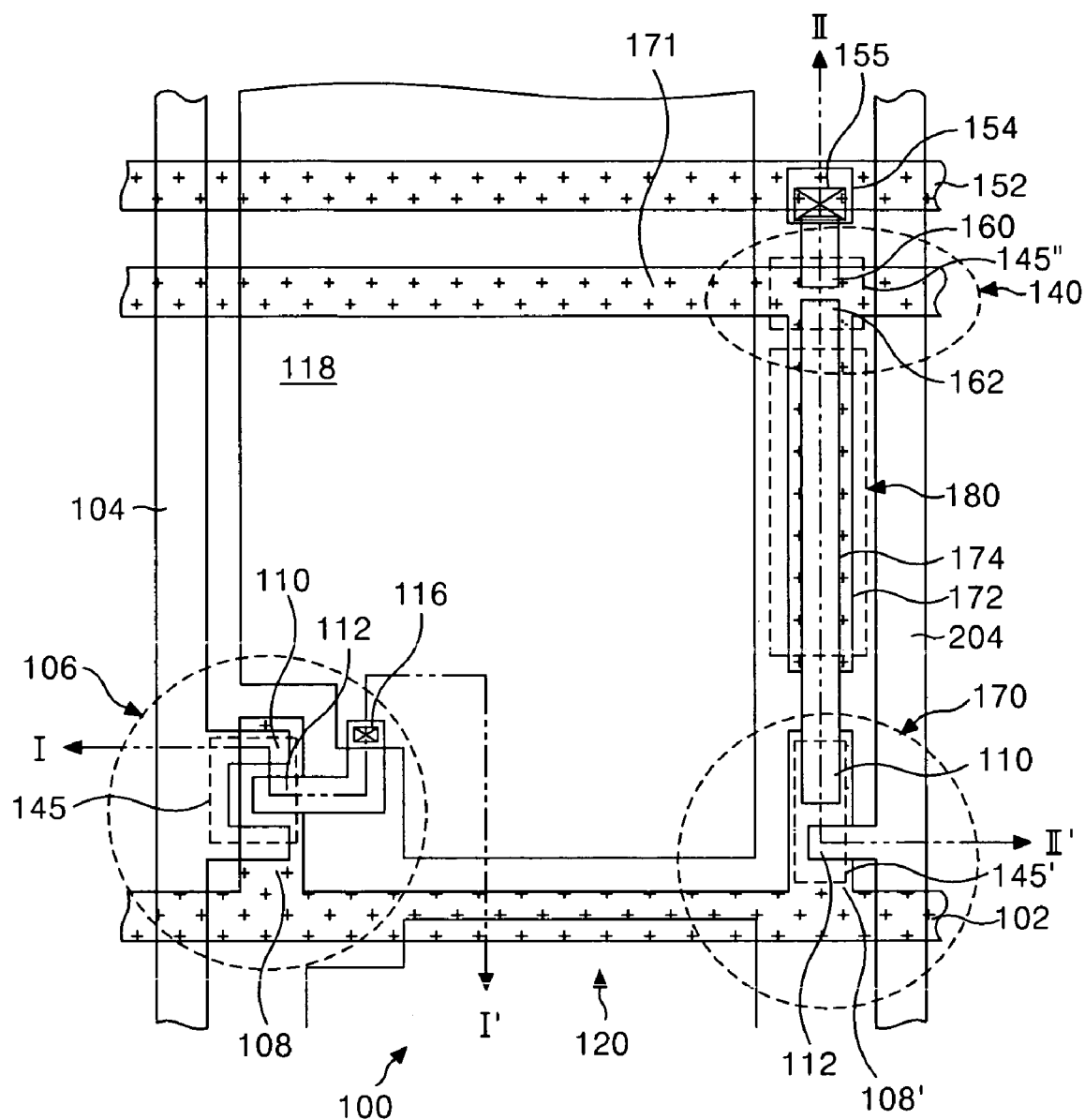
FIG. 2 is a plan view illustrating a pixel area of a TFT array substrate of a liquid crystal display device having an image sensing function.
Figure 3:
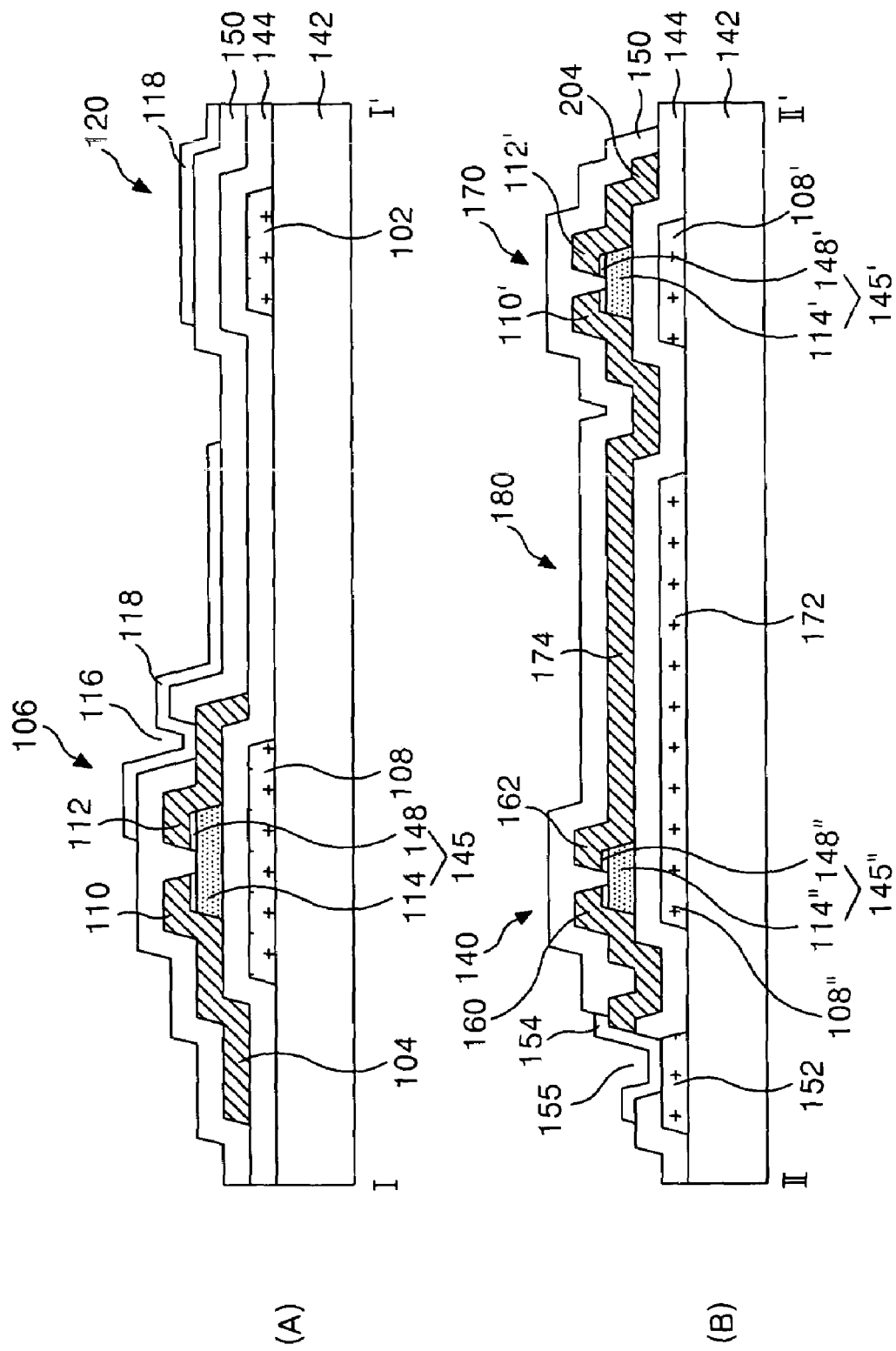
FIG. 3A and 3B are sectional diagrams illustrated by taking along the lines I-I' and II-II' of FIG. 2, respectively.

FIG. 2 is a plan view illustrating a pixel area 100 of a liquid crystal display device having an image sensing function according to a first embodiment. FIG. 3A and 3B are sectional diagrams illustrating the pixel area 100 of FIG. 2 by taking along the lines I-I' and II-II' shown in FIG. 1. FIGS. 2 and 3 illustrate a TFT array substrate of the liquid crystal display device.

Figure 4:
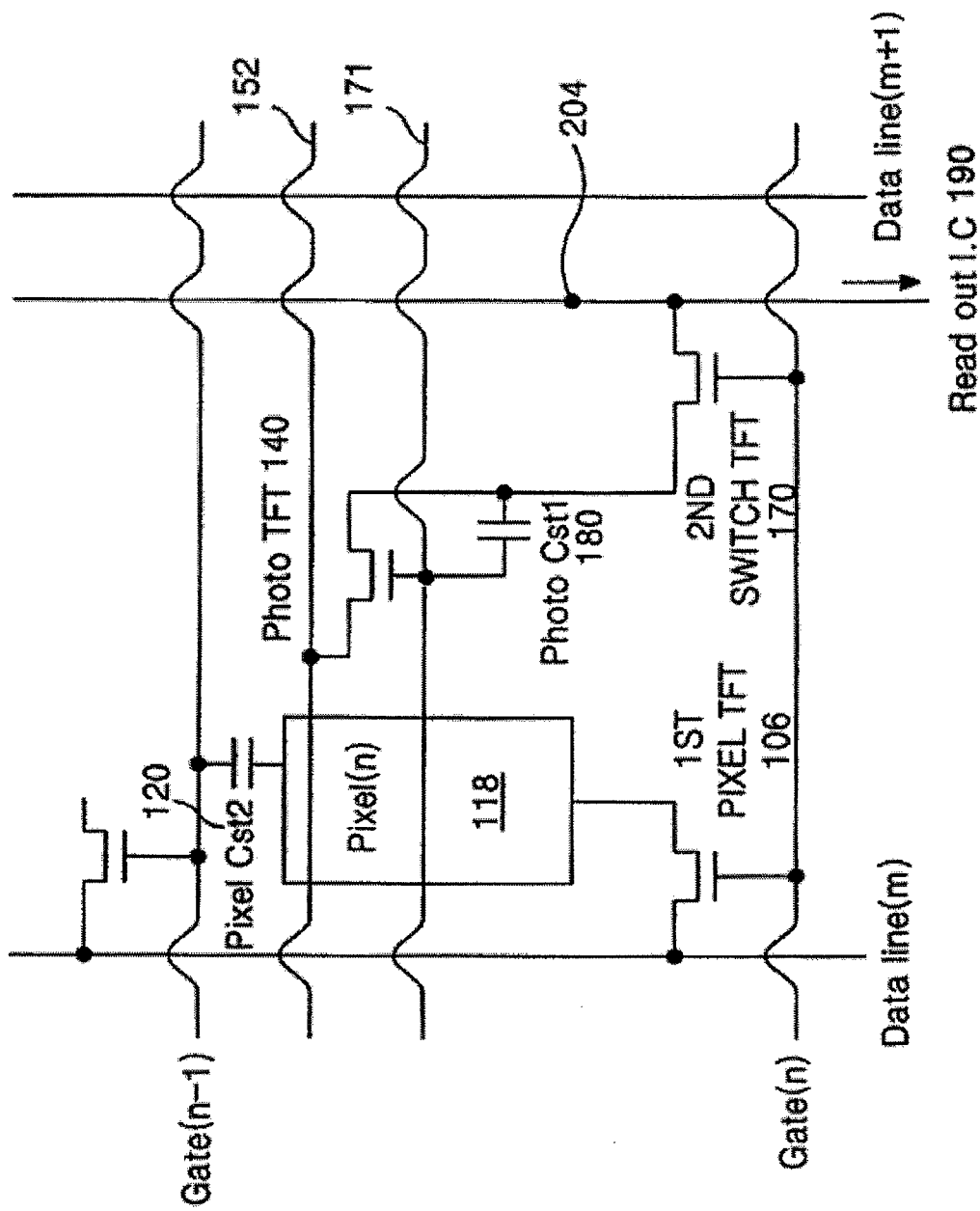
FIG. 4 is a circuit diagram of the pixel area of FIG. 2.

Referring to FIGS. 2 and 3A-3B, the pixel area 100 includes a gate line 102 and a data line 104. The gate line 102 and the data line 104 are formed on a lower substrate 142 and a gate insulating film 144 and intersect each other. The pixel area 100 further includes a pixel switch TFT 106 (hereinafter, referred to as "first TFT") formed at each intersection of the gate line 102 and the data line 104. A pixel electrode 118 is formed between a read-out line 204 and the data line 104, which are in parallel to each other. First and second drive voltage supply lines 152, 171 are formed in parallel to the gate line 102 to supply first and second drive voltages to a photo TFT 140. The photo TFT 140 is formed at the intersection of the first drive voltage supply line 152 and the read-out line 204. A switch TFT 170 (hereinafter, referred to as "second TFT") is formed at an intersection of the gate line 102 and the read-out line 204. A photo sensing storage capacitor 180 (hereinafter, referred to as "first storage capacitor") is located between the photo TFT 140 and the second TFT 170. A pixel storage capacitor 120 (hereinafter, referred to as "second storage capacitor") is formed at an overlapping part of the pixel electrode 118 of a previous stage and the gate line 102. The second storage capacitor 120 is assigned for use with a neighboring pixel of a next stage. The second storage capacitor 120 may be formed with the pixel electrode 118 and a gate line of a previous stage as shown in FIG. 4 (Pixel Cst2).

The first TFT 106 includes a gate electrode 108 connected to the gate line 102, a source electrode 110 connected to the data line 104, a drain electrode 112 connected to a pixel electrode 118 and an active layer 114. The active layer 114 is formed to overlap with the data line 104, the source electrode 110 and the drain electrode 112 and further includes a channel part between the source electrode 110 and the drain electrode 112. An ohmic contact layer 148 is further formed on the active layer 114 to provide the ohmic contact with the data line 104, the source electrode 110 and the drain electrode 112. The active layer 114 and the ohmic contact layer 148 are referred to as a semiconductor pattern 145.

The first TFT 106 responds to a gate signal supplied to the gate line 102 to make the pixel electrode 118 charged with a pixel voltage signal and holds the pixel voltage in the pixel electrode 118. The pixel electrode 118 is connected to the drain electrode 112 of the TFT 106 through a first contact hole 116 which penetrates a passivation film 150. The charged pixel voltage generates a potential difference between the pixel electrode 118 and a common electrode, which is formed in an upper substrate (not shown), e.g., a color filter array substrate. Between the color filter array and the TFT array substrate, a liquid crystal is interposed. The color filter array substrate also includes a black matrix, color filters and so on. The potential difference causes the liquid crystal, which is located between the TFT array substrate and the color filter array substrate, to rotate according to dielectric anisotropy, and the light incident from a light source (not shown) through the pixel electrode 118 is transmitted to the upper substrate.

The second storage capacitor 120 is formed by the gate line 102 and the pixel electrode 118 from the previous stage. The gate insulating film 144 and the passivation film 150 are located between the gate line 102 and the pixel electrode 118. The second storage capacitor 120 helps retaining the pixel voltage charged in the pixel electrode 118 until the next pixel voltage is charged.

The photo TFT 140 includes a gate electrode 108", an active layer 114", a drive source electrode 160 and a drive drain electrode 162. The gate electrode 108" is connected to the second drive voltage supply line 171. The active layer 114" overlaps the gate electrode 172 with a gate insulating film 144 disposed therebetween. The drive source electrode 160 is electrically connected to the active layer 114" and connected to the first drive voltage supply line 152. The drive drain electrode 162 is disposed opposite to the drive source electrode 160. The gate electrode 108" is integrated with a first storage lower electrode 172. The photo TFT 140 includes a second contact hole 155 that penetrates the passivation film 150 and the gate insulating film 144 to partially expose the first drive voltage supply line 152. The drive source electrode 160 is connected to the first drive voltage supply line 152 by a transparent electrode pattern 154 formed on the second contact hole 155. The active layer 114" is formed to overlap the drive source electrode 160 and the drive drain electrode 162, and further includes a channel part between the drive source electrode 160 and the drive drain electrode 162. An ohmic contact layer 148" is further formed on the active layer 114" to provide the ohmic contact with the drive source electrode 160 and the drive drain electrode 162. The photo TFT 140 operates to sense the light which is incident by a designated image such as a document or a human finger print.

The first storage capacitor 180 includes the first storage lower electrode 172 integrated with the gate electrode 108 of the photo TFT 140. The first storage capacitor 180 further includes a first storage upper electrode 174 formed to overlap the first storage lower electrode 172 and connected to the drive drain electrode 162 of the photo TFT 140. The first storage capacitor 180 operates to store the electric charge which is generated by a photo current in the photo TFT 140.

The second TFT 170 includes a gate electrode 108' formed on a substrate 142, a source electrode 110' connected to the first storage upper electrode 174, a drain electrode 112' opposite to the source electrode 110, and an active layer 114' which overlaps the gate electrode 108'. The active layer 114' is formed to overlap the source electrode 110' and the drain electrode 112' and further includes a channel part between the source electrode 110' and the drain electrode 112'. An ohmic contact layer 148' is further formed on the active layer 114' to supply the ohmic contact with the source electrode 110' and the drain electrode 112'.

FIG. 4 is a circuit diagram of the pixel area 100 of FIGS. 2 and 3A and 3B. In FIG. 4, the first TFT 106 is connected to the pixel electrode 118. The pixel electrode is coupled to a gate line (n-1) of a previous stage and forms the second storage capacitor Cst2. The photo TFT 140 is connected to the first drive voltage supply line 152 and the first storage capacitor Cst1 is coupled to the photo TFT 140. The second switch TFT 170 is connected to the first storage capacitor Cst1 and a Read out I.C. 190. The second switch TFT 170 is connected to the readout line 204.

Referring to FIG. 3, an image sensing is described. A first drive voltage is applied to the drive source electrode 160 of the photo TFT 140, and a second drive voltage is applied to the gate electrode 108". A designated light is sensed in the active layer 114" and a photo current is generated. A photo current path runs from the drive source electrode 160 to the drive drain electrode 162 through the channel in accordance with the sensed light intensity. The photo current flows from the drive drain electrode 162 to the first storage upper electrode 174 and the first storage lower electrode 172 is connected to the gate electrode 108' of the photo TFT 140. As a result, the electric charge is charged in the first storage capacitor 180 by the photo current. In this way, the electric charge in the first storage capacitor 180 is read in a read-out IC 190 through the second TFT 170 and the read-out line 204.

The signal detected at the read-out IC 190 differs in accordance with the light intensity sensed in the photo TFT 140. The image such as document, image scan, touch input and so on may be sensed. The sensed image is transmitted to a controller or may be realized in a picture of a liquid crystal display panel in accordance with a user's control.

Figure 5:
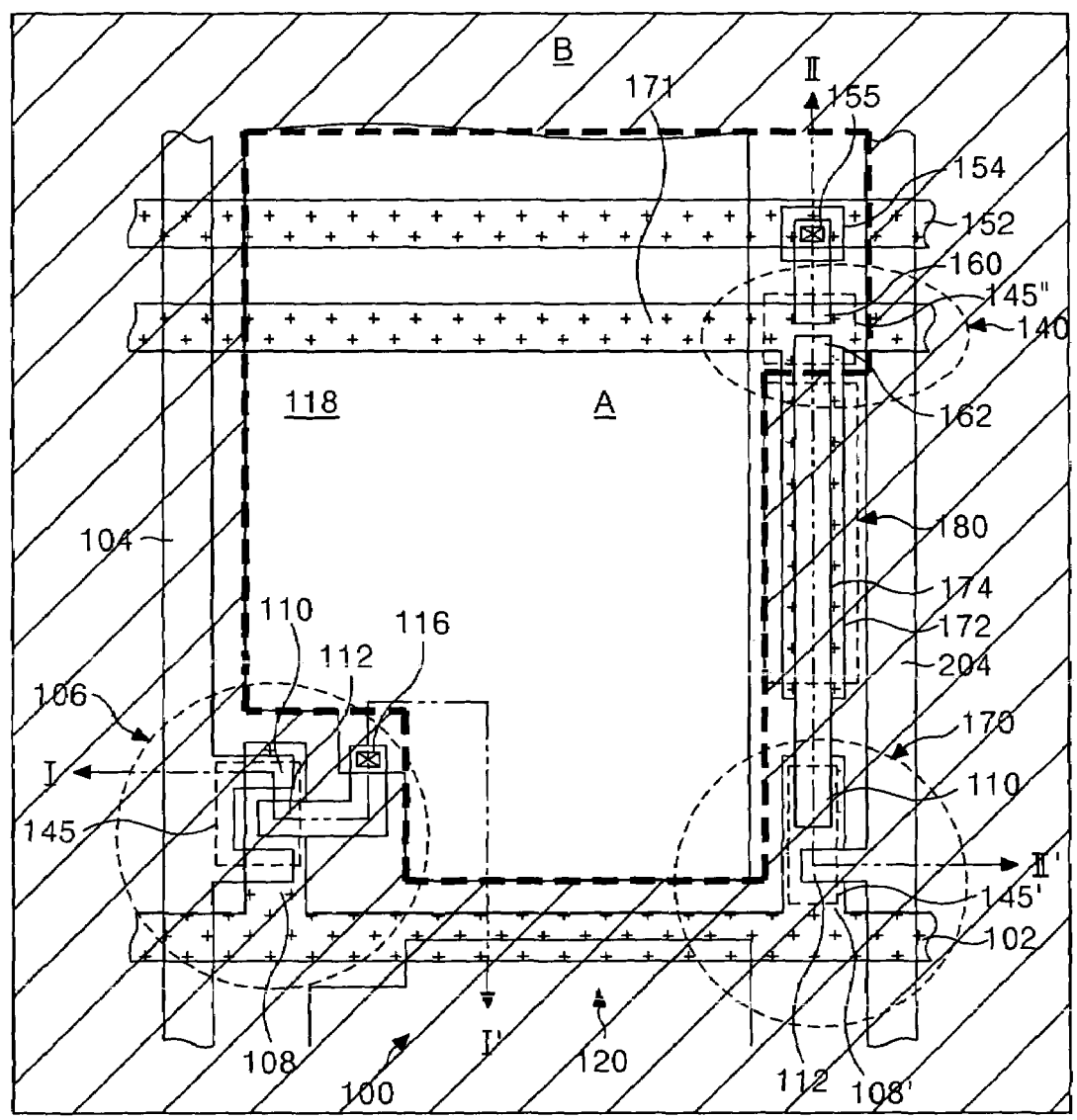
FIG. 5 is a diagram illustrating an area covered by a black matrix.

In FIG. 5, a black matrix B of the color filter array substrate covers the pixel area 100, except for an area A where the pixel electrode 118 is located and the photo TFT 140 for sensing light.

Figure 6:
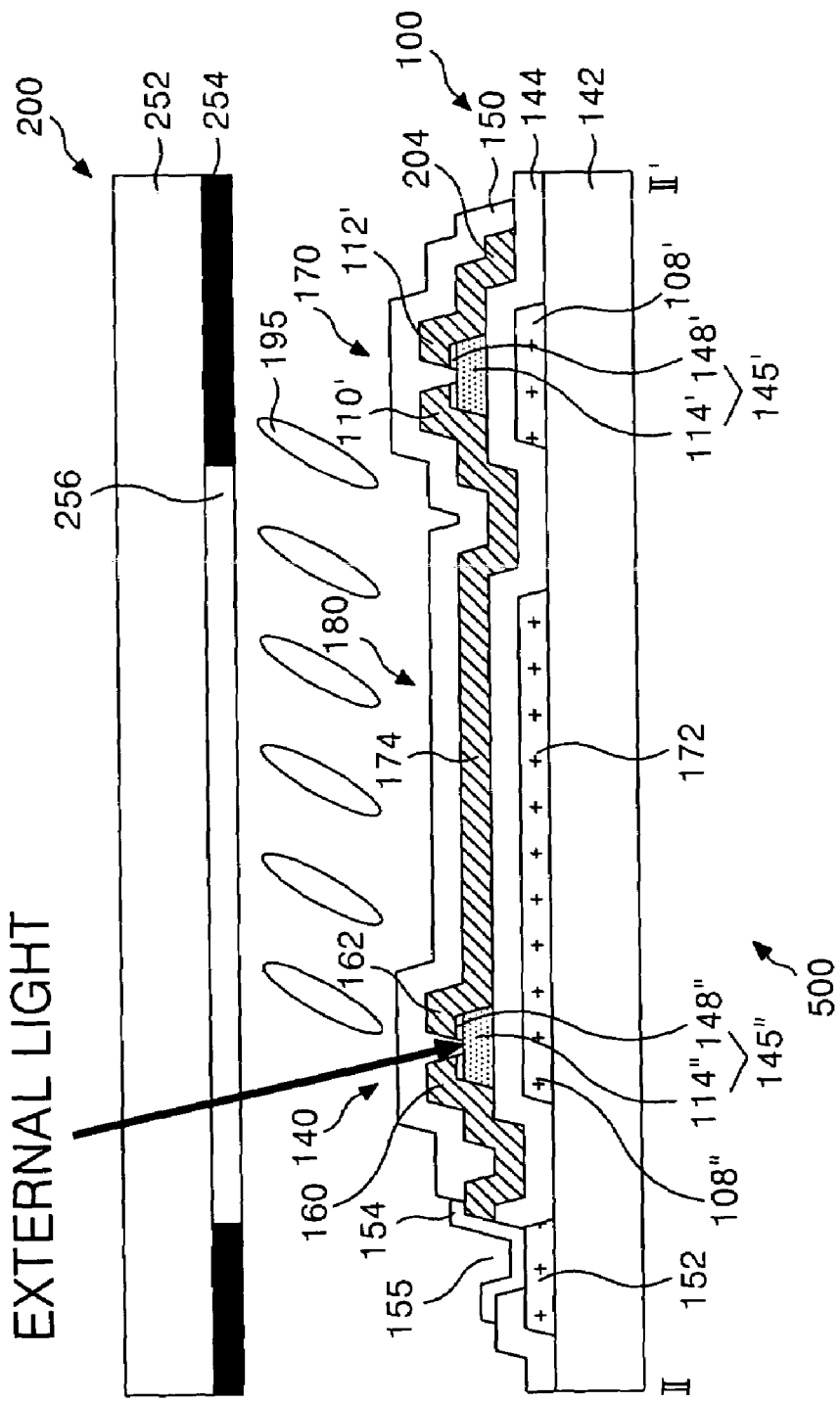
FIG. 6 is a sectional diagram illustrating a photo sensing method according to a first embodiment.
Figure 7:
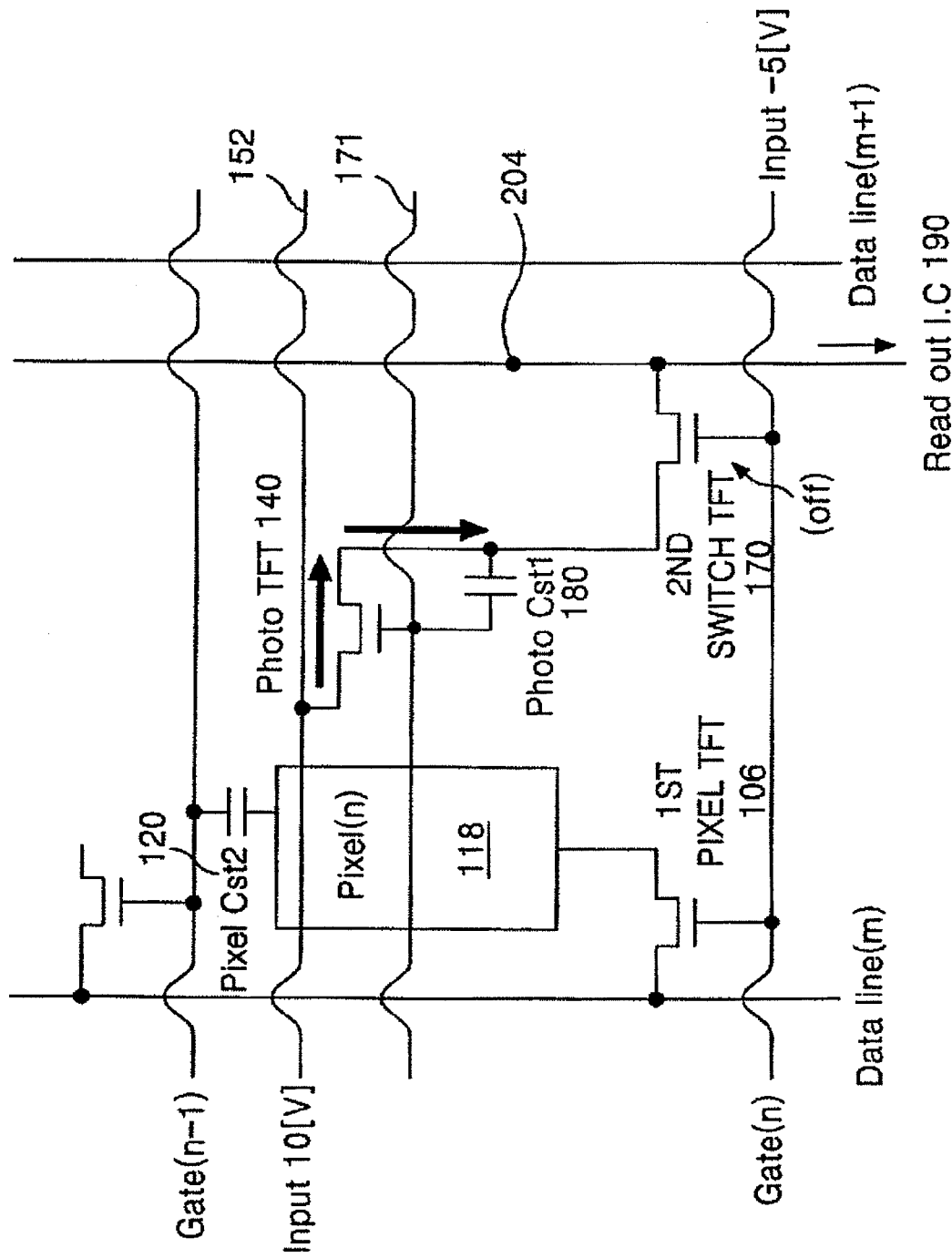
FIGS. 7 and 8 are circuit diagrams illustrating the photo sensing method according to the first embodiment.
Figure 8:
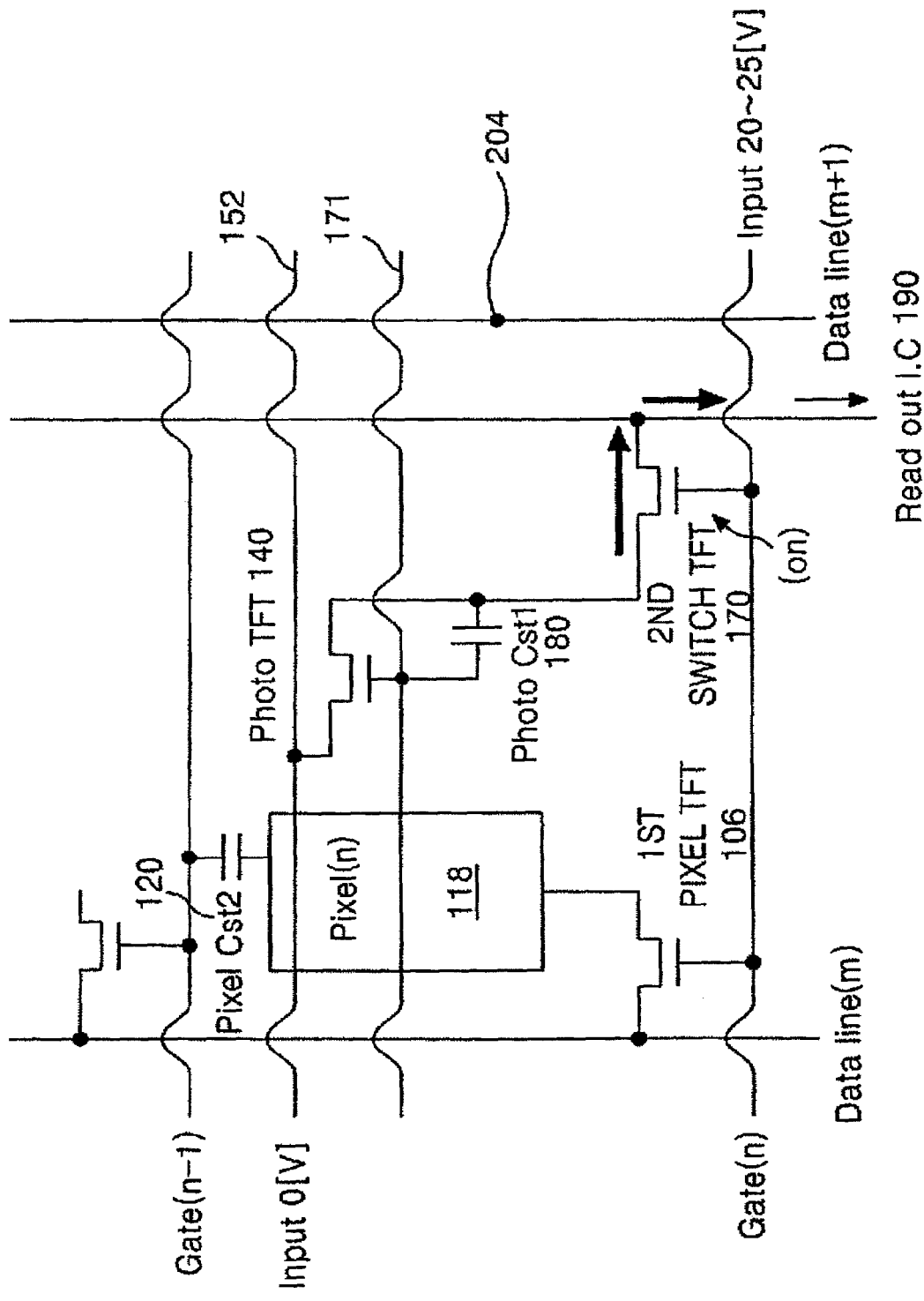

FIG. 6 is a sectional diagram illustrating a liquid crystal display device 500 having an image sensing operation according to the first embodiment, and FIG. 7 is a circuit diagram illustrating an image sensing operation of the liquid crystal display device 500. FIG. 8 is a circuit diagram illustrating detection of a sensed signal by a read-out IC. The liquid crystal display device 500 of FIG. 6 includes the pixel area 100 of the TFT array substrate of FIGS. 2 and 3A-3B. A color filter array substrate 200 and the TFT array substrate 100 are disposed opposite to each other with liquid crystal 195 disposed therebetween. The color filter array substrate 200 includes a black matrix 254 and a color filter 256 corresponding to the pixel area. The black matrix 254 masks the second TFT 170 and opens the pixel area and the photo TFT 140.

Referring to FIG. 7, the image sensing operation of the liquid crystal display device 500 is described. A driving voltage, e.g., about 10V, is applied to the drive source electrode 160 of the photo TFT 140 from the first drive voltage supply line 152, and a reverse bias voltage, e.g., about −5V, is applied to the gate electrode 108" of the photo TFT 140 from the second drive voltage supply line 171. A light, e.g., an external light, is sensed at the active layer 114" and a photo current is generated. The photo current flows from the drive source electrode 160 to the drive drain electrode 162 through the channel of the active layer 114 in accordance with the sensed light intensity. The photo current further runs from the drive drain electrode 162 to the first storage upper electrode 174, and the first storage lower electrode 172 is integrated with the gate electrode 108" of the photo TFT 140. Thus, the electric charge is stored in the first storage capacitor 180 (Photo Cst1) by the photo current. The maximum charge amount of the first storage capacitor 180 may be the voltage difference between the drive source electrode 160 and the gate electrode 108", e.g. about 15V. In FIG. 7, while the photo TFT 140 senses light and the electric charge is charged in the first storage capacitor 180, the gate low voltage, e.g., −5V, is applied to the gate electrode 108 of the second TFT 170, and the second TFT 170 is kept in a turned-off state.

As shown in FIG. 8, when a high voltage, e.g., about 20~25V, is applied to the gate electrode 108' of the second TFT 170, the second TFT 170 is turned on. The current from the electric charge charged in the first storage capacitor 180 runs toward the read-out IC 190 through the source electrode 110' of the second TFT 170, the active layer 114' channel, the drain electrode 112' and the read-out line 204. The sensing signal is read by the read-out IC 190.

The liquid crystal display device 500 performs the display operation which realizes the picture as well as the image sensing capacity. The liquid crystal display device 500 is able to input an external document and a touch and output the input image in accordance with a user's request.

Figure 9:
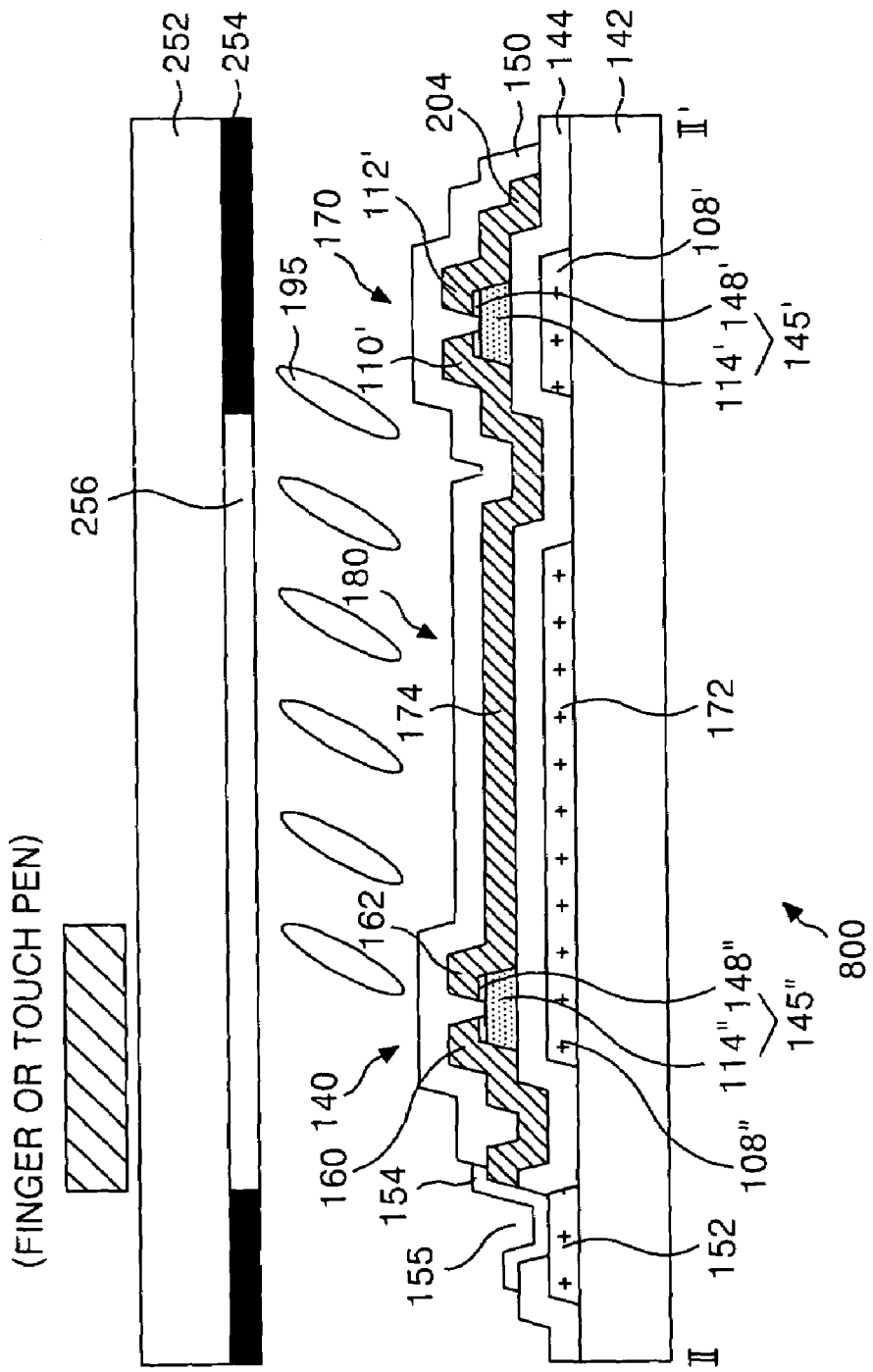
FIG. 9 is a sectional diagram illustrating a photo sensing method of FIG. 6.

FIG. 9 is a sectional diagram illustrating a liquid crystal display device 800 according to a second embodiment. In the liquid crystal display device 800, images are input by a finger or a touch pen (hereinafter, referred to as "Image"). The external light is intercepted in an area which is covered by the Image to turn off the photo TFT 140, which is disposed in a shielding area corresponding to the Image. In other embodiment, due to the Image, the photo TFT 140 generates only a small amount of the photo current. The photo TFT 140 is turned on if it is not covered by the Image because a large intensity of light is sensed. In other words, the position information of the Image may be obtained to the extent of photo sensing, or with the turn-on and turn-off of the photo TFT 140 in the liquid crystal display device 800.

In the liquid crystal display device 800, the photo sensing principle is that the photo current increases in the area, to which the external light is irradiated, to increase the amount of electric charge which is charged in the first storage capacitor 180. On the other hand, the external light is intercepted in the area corresponding to the Image so as not to increase the photo current and decrease the amount of electric charge stored in the first storage capacitor 180. The liquid crystal display device 800 operates to perform sensing and reading of the sensed signal, as described in conjunction with FIGS. 7 and 8, except that the position of the Image is determined based on any difference in value which is read in a series of processes.

Figure 10:
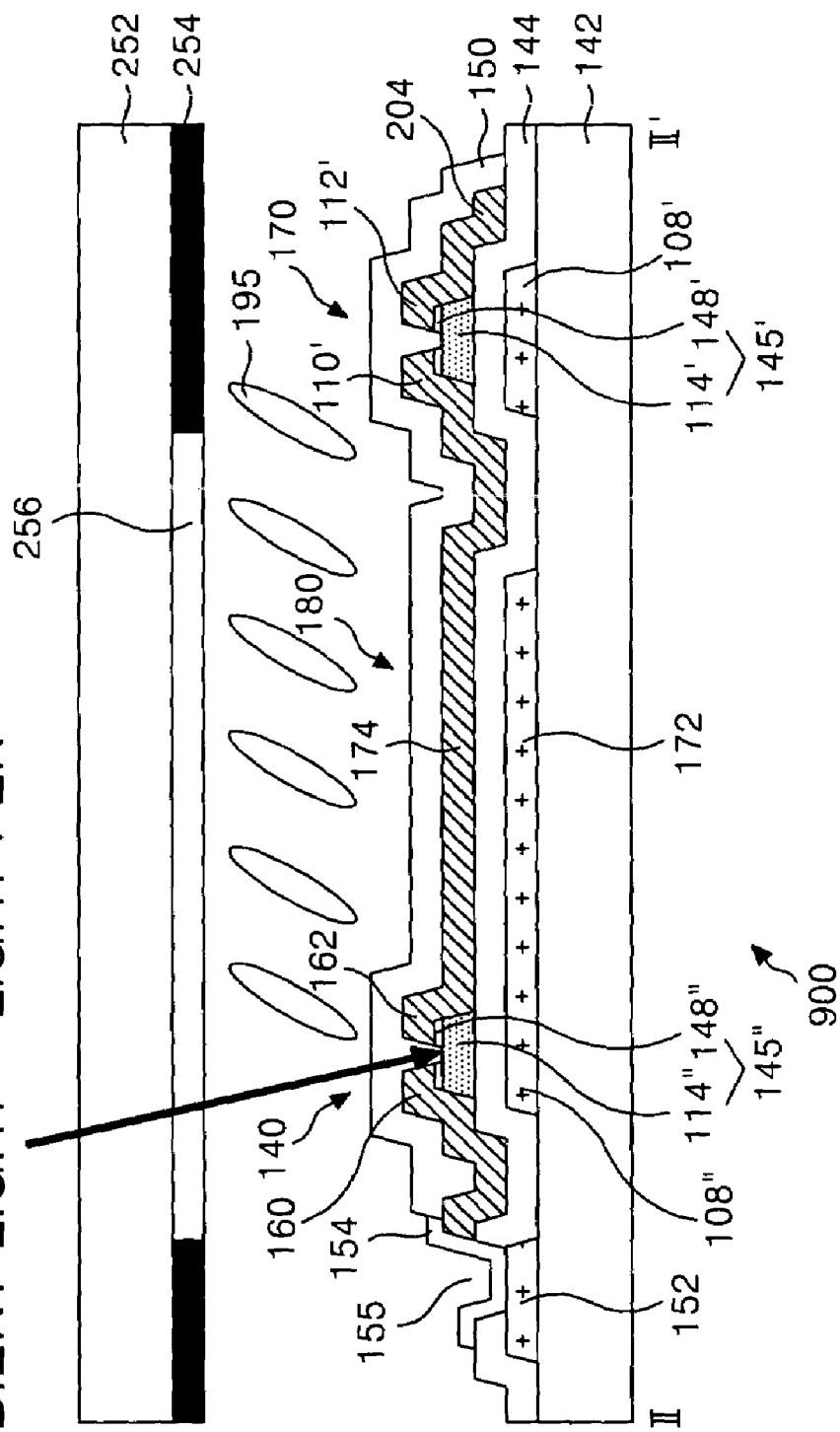
FIG. 10 is a sectional diagram illustrating a photo sensing method according to a third embodiment.

FIG. 10 is a sectional diagram illustrating a liquid crystal display device 900 having an image sensing function according to a third embodiment. The third embodiment shown in FIG. 10 illustrates that light of a light pen such as an LED pen as well as an ambient light is irradiated upon the photo TFT 140, thereby sensing the irradiated light intensity.

The liquid crystal display device 900 operates based on the sensing principle that if the light of the light pen together with the ambient light is irradiated, the photo current is generated. The amount of the photo current is greater than that of the liquid crystal display device 500 in the first embodiment. This is in part because the intensity of light is stronger in this embodiment. Accordingly, the amount of charge stored in the first storage capacitor 180 is larger than that of the liquid crystal display devices 500 and 800 in the first and second embodiments and the amount of current passing through the second TFT 170 and the read-out line 204 becomes larger. As a result, the read-out IC 190 may detect greater signals.

Figure 11:
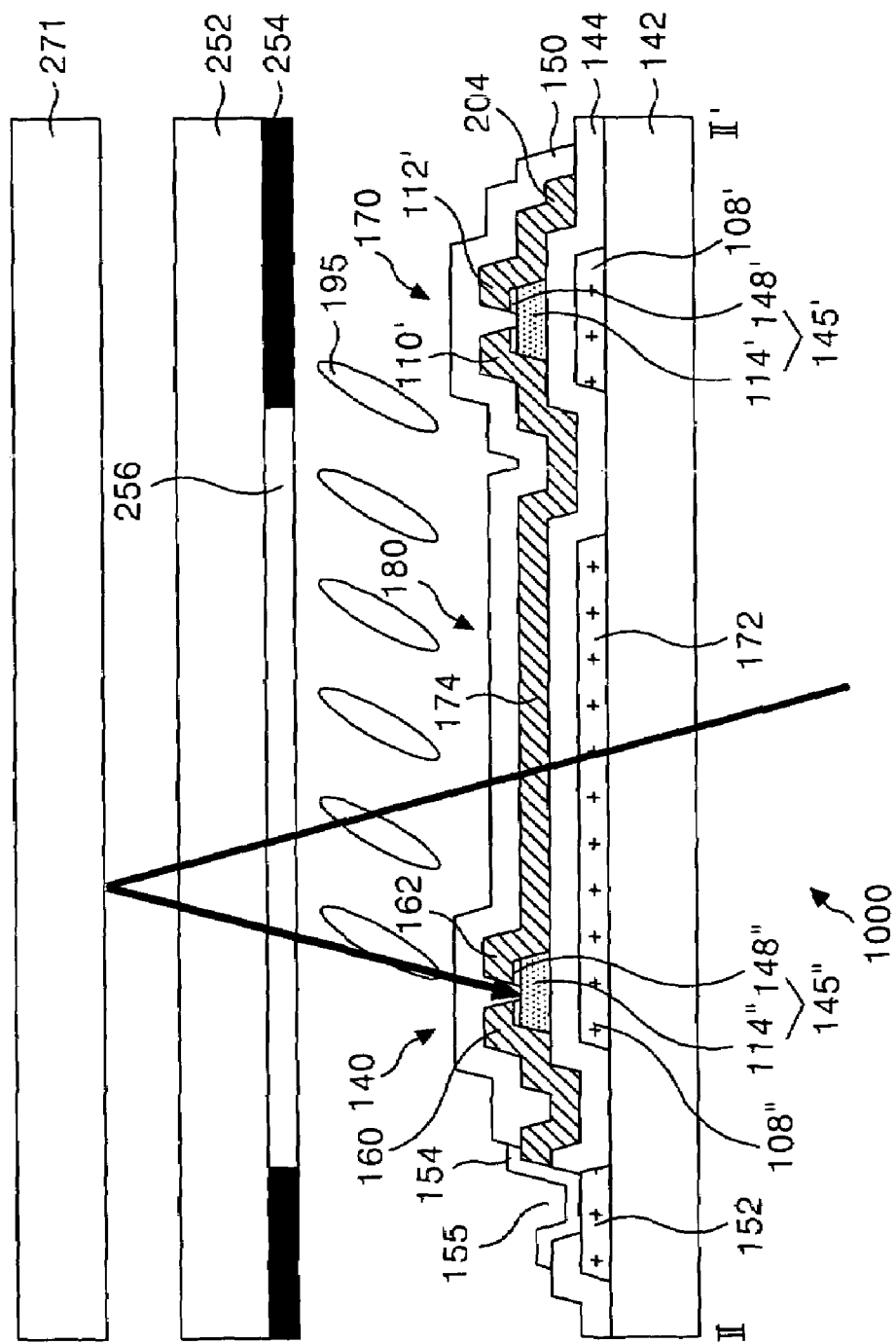
FIGS. 11 and 12 are sectional diagrams illustrating a photo sensing method according to a fourth embodiment.
Figure 12:
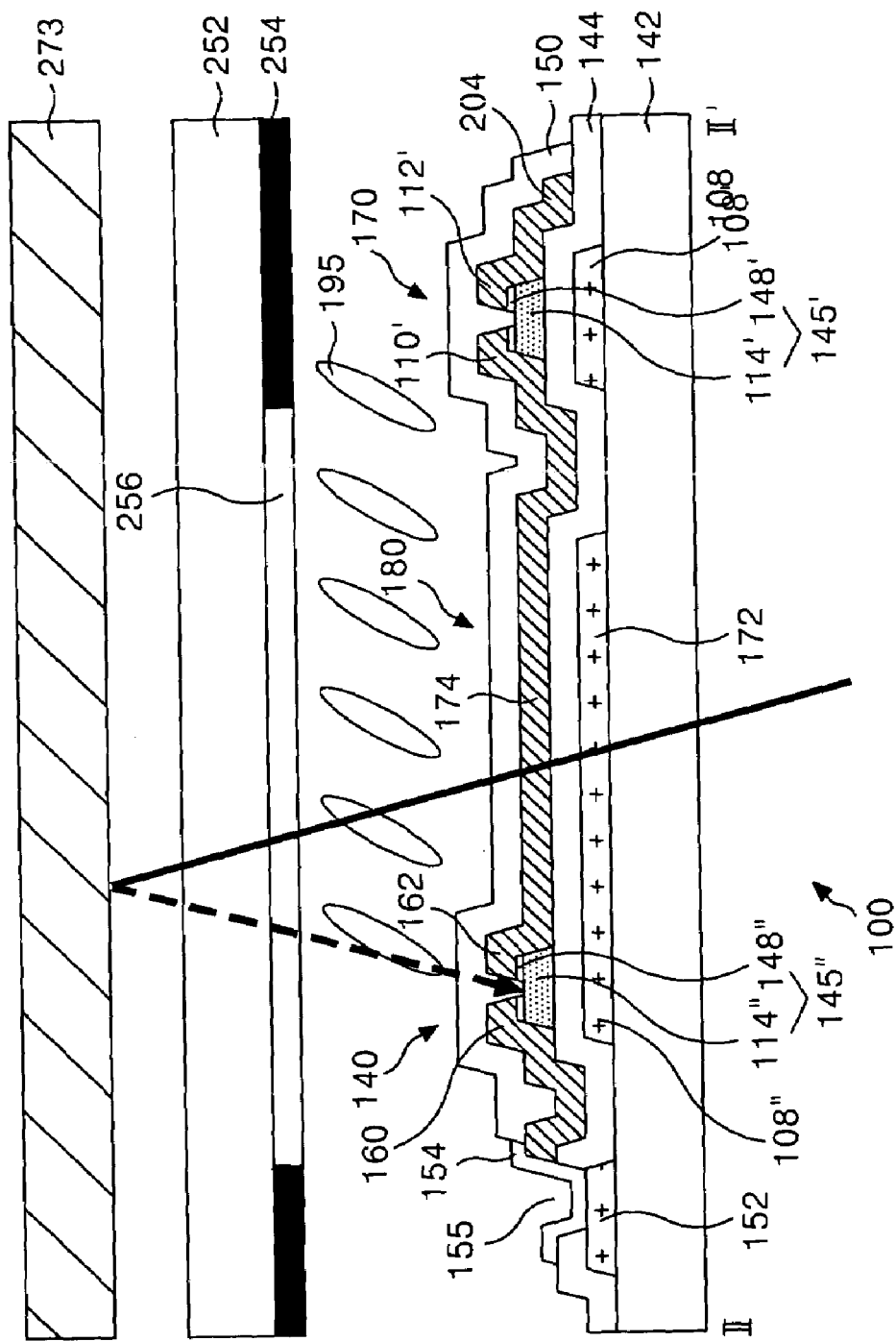

FIGS. 11 and 12 are sectional diagrams illustrating a liquid crystal display device 1000 having the image sensing function according to a fourth embodiment. The liquid crystal display device 1000 performs a scanner operation that may scan a printed matter having brightness and darkness. FIG. 11 illustrates a reflection in a blank space of a paper 271, i.e., an area where there is no designated image. FIG. 12 illustrates a reflection in an image area of a paper 273, e.g., a picture, characters, symbols and so on.

In the liquid crystal display device 1000, after light from a backlight located at the lower part of a liquid crystal display panel passes through the liquid crystal display panel, it is reflected to the paper 271 and sensed in the photo TFT 140 as shown in FIG. 11. The read-out IC detects the signal which is in accordance with the light intensity of that time. In other words, the read-out IC detects the sensing signal by turning on the second TFT 170 in accordance with the amount of electric charge which is generated by the photo current. The photo current is generated by the light reflected in the background or bright area of the paper, i.e., an area where there is no black ink.

In FIG. 11, after the light from the backlight passes through the liquid crystal display panel, it is reflected in the dark area and sensed in the photo TFT 140. For example, the dark area of the paper 273 includes an area where there is black ink such as characters and symbols. The read-out IC detects the signal in accordance with the light intensity of that time. In other words, the read-out IC detects the sensing signal by turning on the second TFT 170 in accordance with the amount of electric charge which is generated by the photo current generated by the light reflected in the dark area of the paper 273.

The character and image may be separated from the black space and the non-image area within the paper 271 and 273 because the light intensity sensed in the photo TFT 140 from the paper 273 may differ from intensity sensed from the paper 271. Scanning may be done in accordance with the signal detected through a series of sensing processes and the sensed image may be displayed in a picture in accordance with a user's request.

In FIGS. 13A to 13E, a fabrication method of a liquid crystal display panel having the image sensing function is described. For convenience of the description, the same reference numerals used in FIG. 2 and 3A-3B are used. After the gate metal layer is formed on the lower substrate 142 through a deposition method such as a sputtering method, a gate metal layer is patterned by a photolithography process and an etching process. As shown in FIG. 12A, gate patterns are formed to include the gate line 102, the gate electrode 108' of the first TFT 106 and the gate electrode 108 of the second TFT 170. Further, the gate patterns include the first drive voltage supply line 152, the first storage lower electrode 172 of the first storage capacitor and the second drive voltage supply line 171.

Figure 13B:
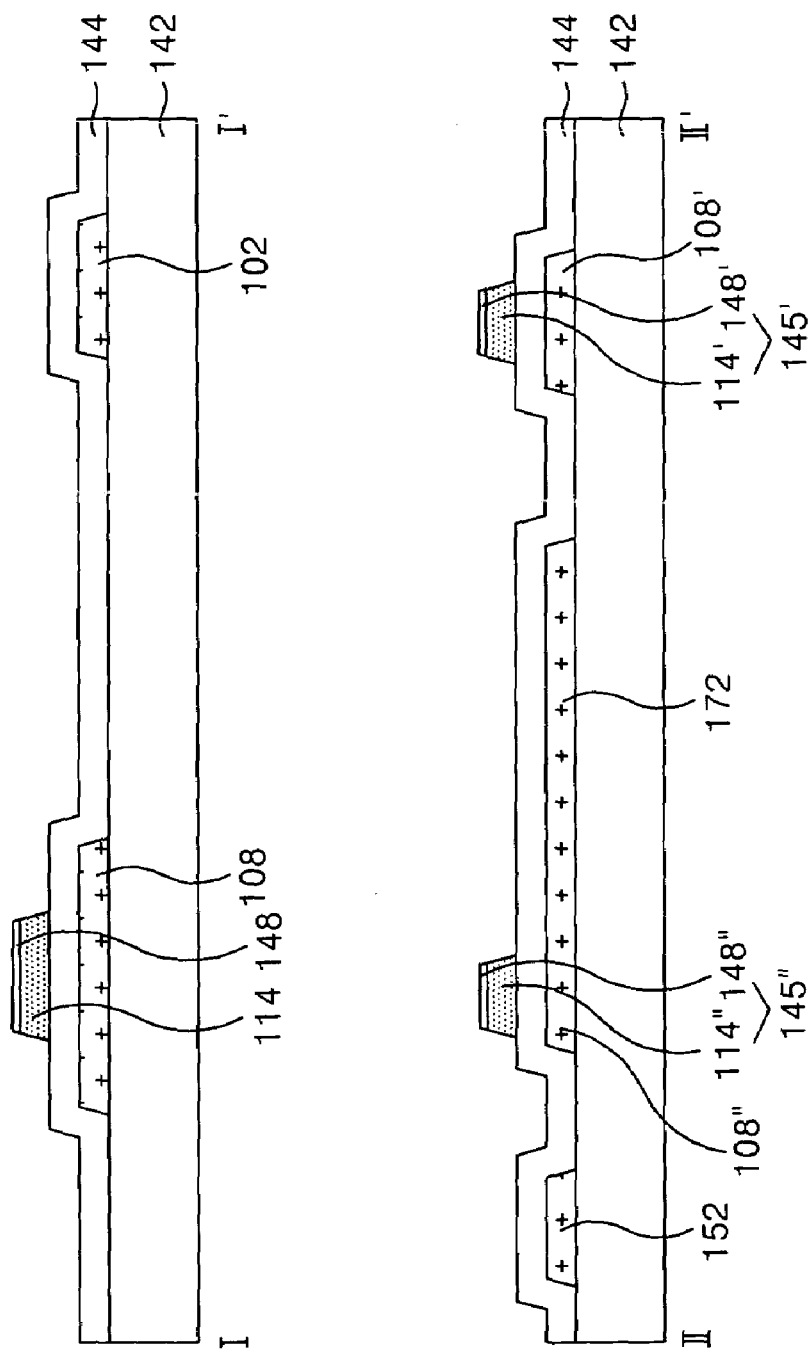

In FIG. 13B, the gate insulating film 144 is formed on the lower substrate 142 where the gate patterns are formed through the deposition method such as PECVD, sputtering and so on. An amorphous silicon layer and an N+ amorphous silicon layer are sequentially formed on the lower substrate 142 where the gate insulating film 144 is formed. The amorphous silicon layer and the N+amorphous silicon layer are patterned by a mask photolithography process and an etching process. In FIG. 13B, the semiconductor patterns 145, 145' and 145" of the first and second TFT's 106, 170 and the photo TFT 140 are formed. The semiconductor patterns 145, 145' and 145" include a double layer of the active layer 114, 114' and 114" and the ohmic contact layer 148, 148' and 148".

Figure 13C:
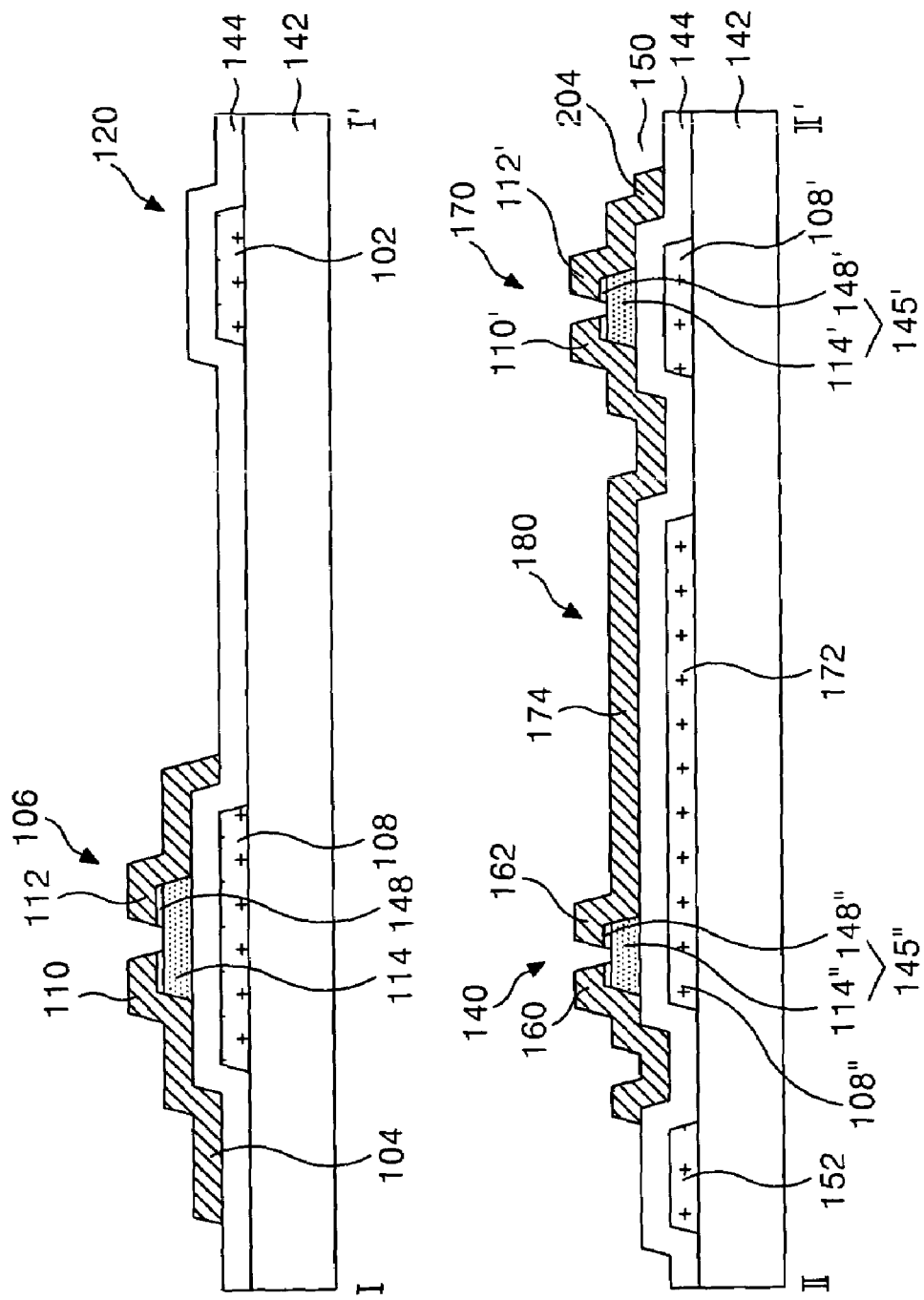

After sequentially forming a source/drain metal layer on the lower substrate 142 where the semiconductor pattern 145, 145' and 145" is formed, a source/drain pattern is formed as shown in FIG. 13C. The source/drain pattern includes the data line 104, the source electrode 110, 110' of the first and second TFTs 106, 170, the drain electrode 112 and 112', the drive source electrode 160 and the drive drain electrode 162 of the photo TFT 140, and the first storage upper electrode 174 connected to the drain electrode 162 of the photo TFT 140. For example, the photolithography process and the etching process may be used along with a mask.

Figure 13D:
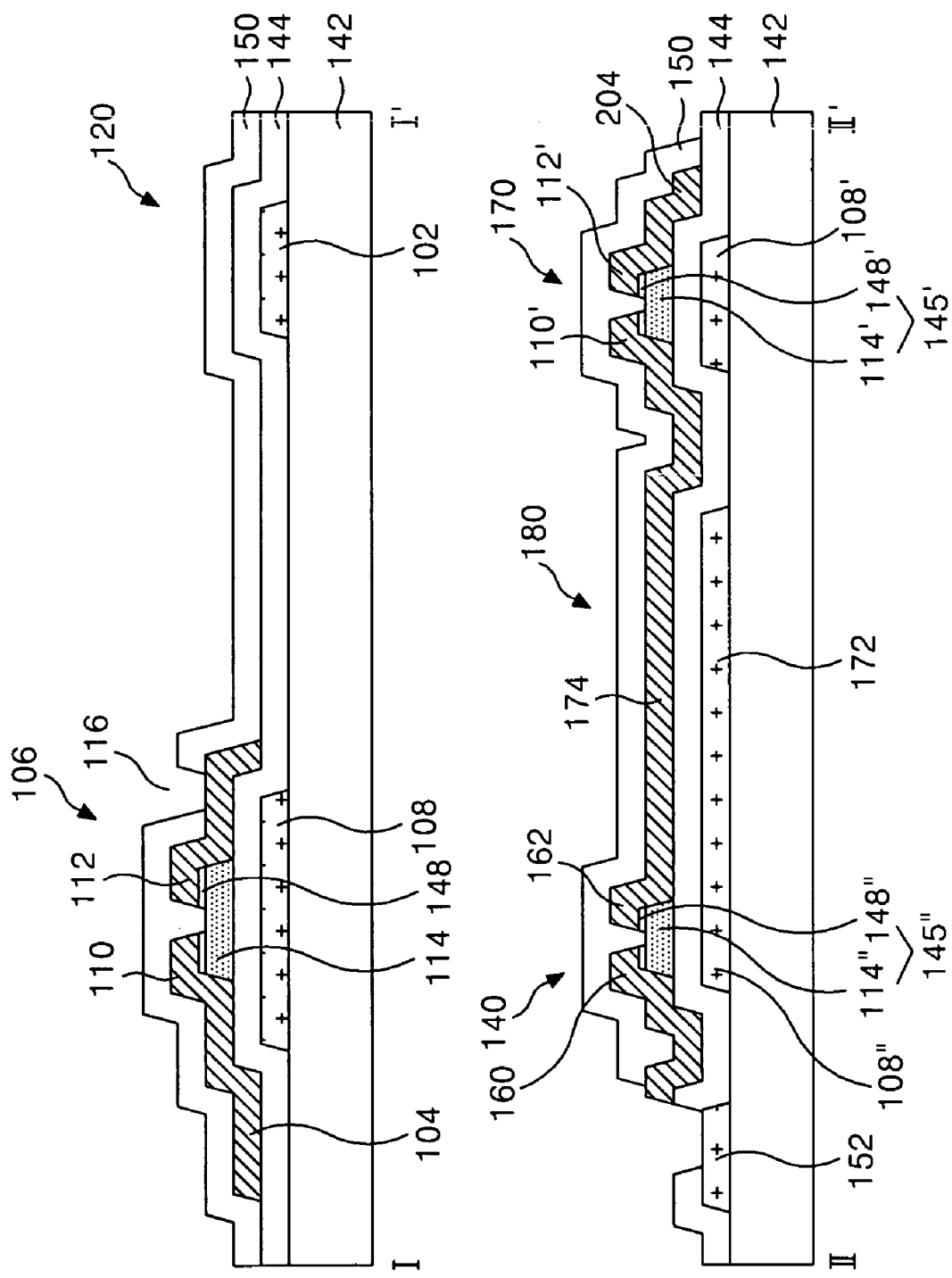

In FIG. 13D, the passivation film 150 is formed on the entire surface of the gate insulating film 144 where the source/drain pattern is formed, by a deposition method such as PECVD and so on. The passivation film 150 is patterned by the photolithography process and the etching process as shown in FIG. 13D, thereby forming a first contact hole 116 which exposes the drain electrode 112 of the first TFT 106 and a second contact hole 155 which exposes the first drive voltage supply line 152.

Figure 13E:
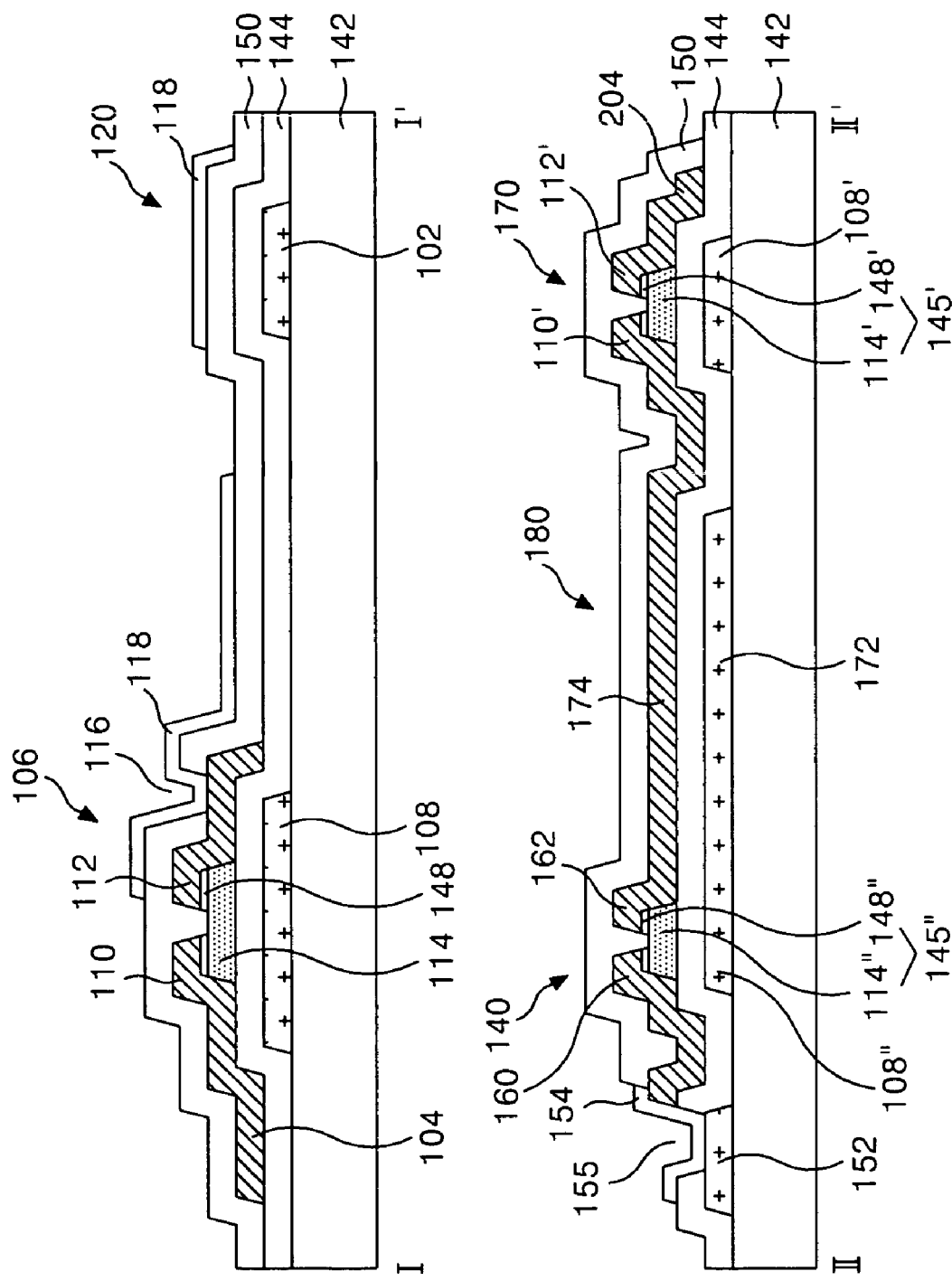

In FIG. 13E, a transparent electrode material is patterned through the photolithography process and the etching process after the transparent electrode material is deposited on the entire surface of the passivation film 150 by the deposition method such as sputtering and so on. A transparent electrode pattern 154 for electrically connecting the pixel electrode 118, the first drive voltage supply line 152 and the drive source line 160 are formed. The pixel electrode 118 is electrically connected to the drain electrode 112 through the contact hole 116. Further, the pixel electrode 118 is formed to overlap the previous stage gate line 102, thereby forming the second storage capacitor 120.

As noted above, the liquid crystal display device having the image sensing function is manufactured with a 5-mask process. The gate pattern is formed on the substrate, the first, second and third semiconductor patterns are formed over the gate pattern. The first, second and third source/drain patterns are formed on the first, second and third semiconductor patterns. During this process, the photo TFT, the pixel TFT and the switching TFT are formed. The passivation film is formed to form the contact hole and the transparent electrode pattern is formed to include the pixel electrode. No additional process may be needed to provide the image sensing function. The 5-mask process for manufacturing the liquid crystal display device may be used to provide both the display function and the image sensing function. The manufacturing process may be simplified and production expenses may be reduced.

Figure 14:
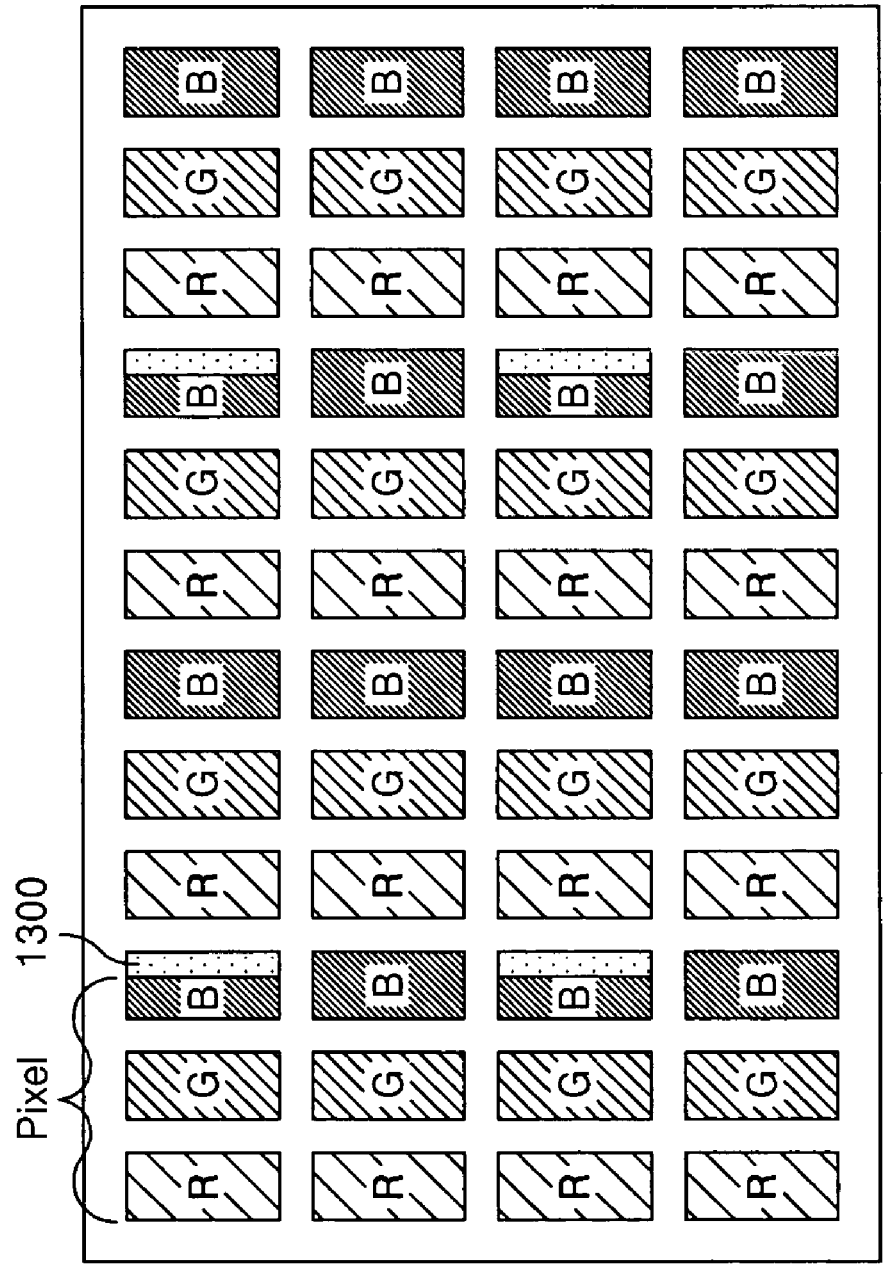
FIG. 14 is a diagram representing positions of photo sensing devices.

Each of red R, green G and blue B sub-pixels constituting a pixel is arranged as shown in FIG. 14. A photo sensing device 1300 inclusive of the photo TFT 140 and the second TFT 170 might be formed at one of four pixels. The photo sensing device 1300 may be formed only in a blue B sub-pixel which minimizes any effect on the display transmission characteristics. Alternatively, or additionally, it may be formed at one of six pixels or one of two pixels. The photo sensing device 1300 may be formed randomly without being limited to the arrangement shown in FIG. 14.

As described above, the liquid crystal display device may provide the image sensing function, which may sense documents, images and so on. The liquid crystal display device may realize the sensed image as a picture. The sensed image may be input and output in the liquid crystal display device. As a result, production cost may be reduced and size of the liquid crystal display device may be compact.

It should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
    a data line supplying a data voltage;
    a gate line intersecting the data line;
    a first thin film transistor "TFT") located at an intersection area of the gate line and the data line;
    a photo sensing device operable to sense light, wherein the photo sensing device is driven by drive voltages other than the data voltage, wherein the photo sensing device comprises a storage capacitor operable to store charge generated by the light and a photo-TFT that is supplied at least one of the drive voltages; and
    a first drive voltage supply line formed in parallel to the gate line to supply a first drive voltage to the photo TFT, wherein the drive voltages comprise the first drive voltage, wherein the photo-TFT comprises a first source electrode electrically connected to the first drive voltage supply line by a transparent electrode pattern.

2. The liquid crystal display device according to claim 1, wherein the photo sensing device further comprises a second TFT selectively supplying a signal sensed by the photo TFT via the storage capacitor.

3. The liquid crystal display device according to claim 2, wherein the photo sensing device further comprises an integrated circuit receiving the sensed signal from the second TFT.

4. The liquid crystal display device according to claim 3, further comprising a sensing signal transmission line operable to transmit the sensed signal from the second TFT to the integrated circuit.

5. The liquid crystal display device according to claim 2, further comprising a second drive voltage supply line formed in parallel to the first drive voltage supply line to supply the drive voltage to the photo TFT, wherein the drive voltages comprises the second drive voltage.

6. The liquid crystal display device according to claim 5, wherein the first drive voltage supply line is connected to a source of the photo TFT and the second drive voltage supply line is connected to a gate of the photo TFT.

7. The liquid crystal display device according to claim 5, wherein the photo TFT comprises:
    a first gate electrode connected to the second drive voltage supply line; and
    a first drain electrode connected to the second TFT.

8. The liquid crystal display device according to claim 7, wherein the storage capacitor comprises:
    a first storage lower electrode connected to the first gate electrode;
    a first storage upper electrode facing the first storage lower electrode and connected to the first drain electrode; and
    a gate insulating film disposed between the first storage lower electrode and the first storage upper electrode.

9. The liquid crystal display device according to claim 8, wherein the second TFT comprises:
    a second gate electrode extended from the gate line;
    a second source electrode extended from the first storage upper electrode; and
    a second drain electrode connected to the sensing signal transmission line.

10. The liquid crystal display device according to claim 9, further comprising another storage capacitor including a pixel electrode and a neighboring gate line from a previous stage.

11. The liquid crystal display device according to claim 2, further comprising:
    a pixel area disposed at the intersection of the data line and the gate line;
    a color filter array substrate including a color filter corresponding to the pixel area; and
    a black matrix for masking an area except the photo TFT and the pixel area.

12. The liquid crystal display device according to claim 1, wherein the liquid crystal display device comprises red, green and blue pixels and the photo sensing device is disposed in at least one of the red, green or blue pixels.

13. A fabricating method of a liquid crystal display device, comprising:
    forming a gate pattern on a substrate;
    forming first, second and third semiconductor patterns over the gate pattern;
    forming a first source/drain pattern, a second source/drain pattern, and a third source/drain pattern on the first, second and third semiconductor patterns wherein a photo TFT is formed with the first source/drain pattern and a first gate electrode, a pixel TFT is formed with the second source/drain pattern and a switching TFT is formed with the third source/drain pattern;
    forming a passivation film to form a contact hole; and
    forming a transparent electrode pattern which includes a pixel electrode,
    wherein forming the gate pattern includes forming a first storage lower electrode to be in parallel to the data line and connected to the first gate electrode.

14. The fabricating method according to claim 13, wherein forming the gate pattern further comprises:
    forming a first drive voltage supply line to be in parallel to the gate line to supply a first drive voltage to the photo TFT; and forming a second drive voltage supply line to be connected to the gate electrode of the photo TFT and in parallel to the first drive voltage supply line.

15. The fabricating method according to claim 14, further comprising:

forming a first storage upper electrode to overlap the first storage lower electrode with a gate insulating film interposed therebetween wherein the first storage upper electrode forms a first storage capacitor along with the first storage lower electrode.

16. The fabricating method according to claim 14, wherein forming the passivation film comprises:

forming another contact hole that exposes the first drive voltage supply line and a first source pattern of the first source/drain pattern of the photo TFT by penetrating the gate insulating film and the passivation film.

17. The fabricating method according to claim 16, further comprising:

forming a transparent electrode electrically connecting the photo TFT and the first drive voltage supply line through the another contact hole.

\* \* \* \* \*

UNITED STATES PATENT AND TRADEMARK OFFICE
CERTIFICATE OF CORRECTION

PATENT NO. : 7,580,084 B2
APPLICATION NO. : 11/212042
DATED : August 25, 2009
INVENTOR(S) : Sang Hee Yu et al.

It is certified that error appears in the above-identified patent and that said Letters Patent is hereby corrected as shown below:

In the Claims

In column 9, claim 1, line 39, after "first thin film" replace "transistor "TFT")" with --transistor ("TFT")--.

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,580,084 B2 | Page 1 of 1 |
| APPLICATION NO. | : 11/212042 | |
| DATED | : August 25, 2009 | |
| INVENTOR(S) | : Sang Hee Yu et al. | |

It is certified that error appears in the above-identified patent and that said Letters Patent is hereby corrected as shown below:

On the Title page,

[*] Notice: Subject to any disclaimer, the term of this patent is extended or adjusted under 35 U.S.C. 154(b) by 272 days.

Delete the phrase "by 272 days" and insert -- by 354 days --

Signed and Sealed this

Thirty-first Day of August, 2010

David J. Kappos
*Director of the United States Patent and Trademark Office*